(12) United States Patent
Sakamoto et al.

(10) Patent No.: US 10,921,796 B2
(45) Date of Patent: Feb. 16, 2021

(54) COMPONENT INFORMATION RETRIEVAL DEVICE, COMPONENT INFORMATION RETRIEVAL METHOD, AND PROGRAM

(71) Applicant: Mitsubishi Hitachi Power Systems, Ltd., Kanagawa (JP)

(72) Inventors: Kenshi Sakamoto, Yokohama (JP); Kazuhito Ohashi, Yokohama (JP); Hiroyuki Matsuoka, Takasago (JP); Fumiyuki Tora, Takasago (JP); Tsuyoshi Maeda, Takasago (JP); Maho Fujiyama, Takasago (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 217 days.

(21) Appl. No.: 15/998,655

(22) PCT Filed: Feb. 13, 2017

(86) PCT No.: PCT/JP2017/005118
§ 371 (c)(1),
(2) Date: Aug. 16, 2018

(87) PCT Pub. No.: WO2017/141868
PCT Pub. Date: Aug. 24, 2017

(65) Prior Publication Data
US 2020/0225651 A1   Jul. 16, 2020

(30) Foreign Application Priority Data

Feb. 18, 2016   (JP) ................................. 2016-029051

(51) Int. Cl.
*G05B 23/02* (2006.01)
*G09G 5/02* (2006.01)
(Continued)

(52) U.S. Cl.
CPC ..... *G05B 23/0216* (2013.01); *G05B 23/0243* (2013.01); *G06F 3/04817* (2013.01);
(Continued)

(58) Field of Classification Search
CPC combination set(s) only.
See application file for complete search history.

(56) References Cited

U.S. PATENT DOCUMENTS 7,859,544 B2 * 12/2010 Okada .................... G06F 30/00
345/581
2004/0153804 A1 * 8/2004 Blevins .............. G05B 19/0428
714/33
(Continued)

FOREIGN PATENT DOCUMENTS

JP   6-175626   6/1994
JP   7-281853   10/1995
(Continued)

OTHER PUBLICATIONS

International Search Report dated Apr. 25, 2017 in corresponding International Application No. PCT/JP2017/005118.
(Continued)

*Primary Examiner* — Wesner Sajous
(74) *Attorney, Agent, or Firm* — Wenderoth, Lind & Ponack, L.L.P.

(57) ABSTRACT

A system display control unit causes a display unit to display a simulated system screen. A symbol selection unit receives a selection of a symbol from a user. A model display control unit causes the display unit to display a plant model in which a component model corresponding to the component represented by the selected symbol is emphasized. A model selection unit receives a selection of a component model from the user. A component information display control unit
(Continued)

causes the display unit to display information about the component represented by the selected model.

6 Claims, 6 Drawing Sheets

(51) Int. Cl.
    *G09G 5/36*     (2006.01)
    *G06F 30/18*     (2020.01)
    *G06F 3/048*     (2013.01)
    *G06F 3/0481*     (2013.01)
    *G06F 111/20*     (2020.01)

(52) U.S. Cl.
    CPC .............. *G06F 30/18* (2020.01); *G09G 5/02* (2013.01); *G09G 5/36* (2013.01); *G06F 2111/20* (2020.01); *G09G 2354/00* (2013.01)

(56) References Cited

U.S. PATENT DOCUMENTS

| | | | | |
|---|---|---|---|---|
| 2005/0096872 A1* | 5/2005 | Blevins | ............ | G05B 19/41885 |
| | | | | 702/183 |
| 2007/0005266 A1* | 1/2007 | Blevins | ................. | G06Q 50/04 |
| | | | | 702/22 |
| 2007/0129917 A1* | 6/2007 | Blevins | .............. | G05B 19/0428 |
| | | | | 703/6 |
| 2007/0168060 A1* | 7/2007 | Nixon | .................... | G06F 9/451 |
| | | | | 700/83 |
| 2008/0036781 A1 | 2/2008 | Okada | | |

FOREIGN PATENT DOCUMENTS

| | | |
|---|---|---|
| JP | 11-345258 | 12/1999 |
| JP | 11-353341 | 12/1999 |
| JP | 2003-58243 | 2/2003 |
| JP | 2005-4275 | 1/2005 |
| JP | 2005-32002 | 2/2005 |
| JP | 2005-275784 | 10/2005 |
| JP | 2007-334136 | 12/2007 |
| JP | 2008-46703 | 2/2008 |
| JP | 5230668 | 7/2013 |
| KR | 10-2008-0014575 | 2/2008 |

OTHER PUBLICATIONS

Written Opinion of the International Searching Authority dated Apr. 25, 2017 in corresponding International Application No. PCT/JP2017/005118 (with English translation).

\* cited by examiner

COMPONENT INFORMATION RETRIEVAL DEVICE, COMPONENT INFORMATION RETRIEVAL METHOD, AND PROGRAM

TECHNICAL FIELD

The present invention relates to a component information retrieval device, a component information retrieval method, and a program that retrieve's information about a component forming a plant.

This application claims priority based on Japanese Patent Application No. 2016-029051 filed in Japan on Feb. 18, 2016, of which the contents are incorporated herein by reference.

BACKGROUND ART

A monitoring device that monitors a plant displays a system screen indicating a connection relationship between components forming the plant. The system screen displayed on the monitoring device indicates a logical connection relationship between the components. Thus, the system screen does not indicate an actual spatial positional relationship between the components. On the other hand, a three-dimensional model, according to a design of an actual plant, is applied to a simulator used for training an operator of the plant. Thus, the operator can recognize an actual spatial positional relationship between the components by operating the simulator.

The operator needs to operate a component forming the plant, based on specifications and characteristics of the component in order to operate the plant. The operator needs to refer to information about the component, such as a design material about the component, in order to know the specifications and the characteristics of the component.

Patent Document 1 discloses a technology for presenting, in a case where a symbol on a system screen displayed on a monitoring device of a plant is selected, a position of a component represented by the symbol in two-dimensional graphics or three-dimensional graphics.

CITATION LIST

Patent Document

Patent Document 1: JP 2003-58243 A

SUMMARY OF INVENTION

Problem to be Solved by the Invention

The number of components forming a plant is massive, so that there is a large amount of design materials about the components. An operator does not necessarily know a model name or a model number of a component as an operation subject. Thus, it is difficult for the operator to find a design material related to a target component from the large amount of design materials.

The operator can know a spatial position of the component as the operation subject by operating the simulator. In this case, since the operator first needs to know an operation of the simulator in order to know the spatial position of the component, the operator cannot easily know the spatial position of the component. According to the technology described in Patent Document 1, an operator can know a spatial position of a component by selecting a symbol on a system screen. However, it is still difficult to find a design material about the component in the position.

An object of the present invention is to provide a component information retrieval device, a component information retrieval method, and a program that enables an operator to recognize a spatial position of a component forming a plant and to easily acquire information about a desired component.

Solution to Problem

According to a first aspect of the present invention, a component information retrieval device retrieves information about a component forming a plant, the component information retrieval device including: a system display control unit configured to cause a display unit to display a simulated system screen equivalent to a system screen displayed in a monitoring device of the plant, the system screen indicating a symbol representing the component together with a connection relationship between components; a symbol selection unit configured to receive a selection of the symbol from a user; a model display control unit configured to cause the display unit to display a plant model that is formed by a combination of component models each being a three-dimensional model representing the component, the plant model being a three-dimensional model of the plant and including a component model corresponding to the component represented by the selected symbol being emphasized; a model selection unit configured to receive a selection of the component model from the user; and a component information display control unit configured to cause the display unit to display information about the component represented by the selected component model.

According to a second aspect of the present invention, in the component information retrieval device according to the first aspect, the simulated system screen may be a screen that displays information used in an operation of a simulator of the plant.

According to a third aspect of the present invention, in the component information retrieval device according to the first aspect or the second aspect, the number of the symbols included in the simulated system screen may be less than the number of the component models forming the plant model.

According to a fourth aspect of the present invention, in the component information retrieval device according to any one of the first to third aspects, the plant model may be formed by the component models of the components belonging to a system indicated on the simulated system screen.

According to a fifth aspect of the present invention, in the component information retrieval device according to any one of the first fourth aspects, component models representing piping among the component models may be colored in colors different from each other, and the component information retrieval device may further include a detailed system display control unit configured to cause the display unit to display a detailed system diagram that indicates the connection relationship between the components represented by the component models forming the plant model and in which a line representing the connection relationship between the components is colored in the same color as a color of the component model representing the piping connecting the components.

According to a sixth aspect of the present invention, a component information retrieval method is for retrieving information about a component forming a plant, the component information retrieval method including the steps of: causing, by a component information retrieval device, a display unit to display a simulated system screen equivalent to a system screen displayed in a monitoring device of the plant, the system screen indicating a symbol representing the component together with a connection relationship between components; receiving, by the component information retrieval device, a selection of the symbol from a user; causing, by the component information retrieval device, the display unit to display a plant model that is formed by a combination of component models each being a three-dimensional model representing the component, the plant model being a three-dimensional model of the plant and including a component model corresponding to the component represented by the selected symbol being emphasized; receiving, by the component information retrieval device, a selection of the component model from the user; and causing, by the component information retrieval device, the display unit to display information about the component represented by the selected component model.

According to a seventh aspect of the present invention, a program causes a computer of a component information retrieval device for retrieving information about a component forming a plant to: cause a display unit to display a simulated system screen equivalent to a system screen displayed in a monitoring device of the plant, the system screen indicating a symbol representing the component together with a connection relationship between components; receive a selection of the symbol from a user; cause the display unit to display a plant model that is formed by a combination of component models each being a three-dimensional model representing the component, the plant model being a three-dimensional model of the plant and including a component model corresponding to the component represented by the selected symbol being emphasized; receive a selection of the component model from the user; and cause the display unit to display information about the component represented by the selected component model.

Advantageous Effect of Invention

According to at least one aspect of the above-described aspects, the component information retrieval device causes the plant model to be displayed by a selection of symbols displayed on the system screen and causes information about a component to be displayed by selection of a component model displayed in the plant model. In this way, the component information retrieval device allows an operator to recognize a spatial position of the component by an operation on the system screen that the operator is accustomed to operating. A user selects a three-dimensional model representing the component, so that information about the component can be displayed on the component information retrieval device without input of a model name or a model number.

DESCRIPTION OF EMBODIMENTS

First Embodiment

A first embodiment will be described below in detail with reference to the drawings.

Figure 1:
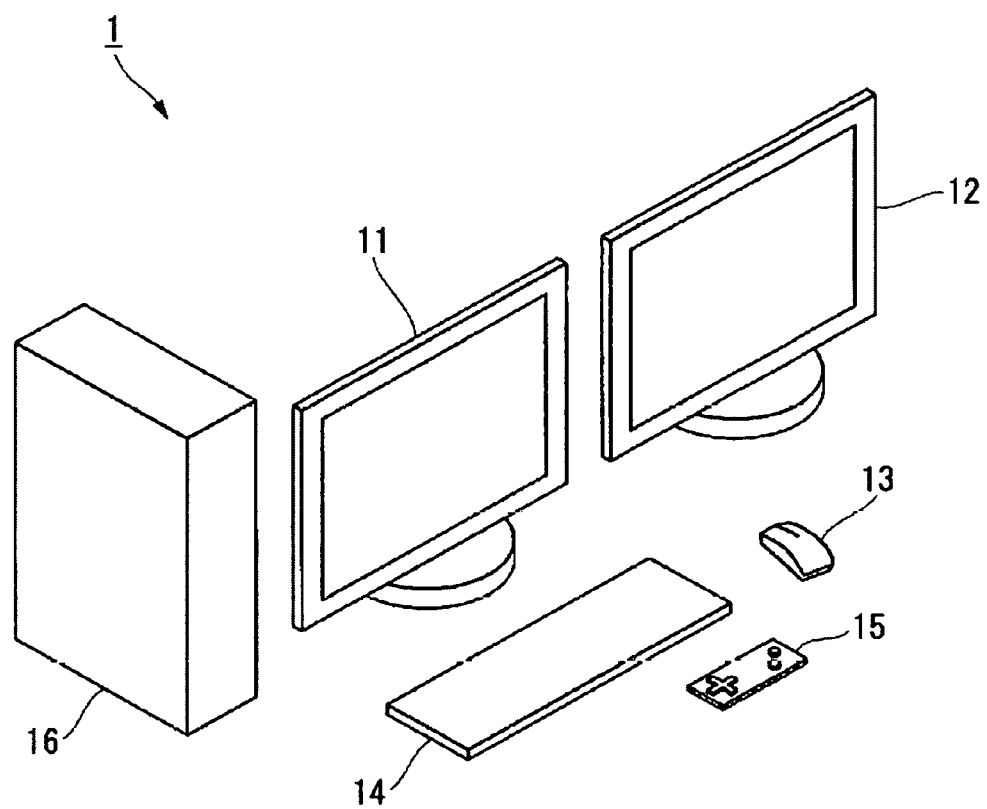
FIG. 1 is a schematic block diagram illustrating an external appearance of a component information retrieval system according to a first embodiment.

FIG. 1 is a schematic block diagram illustrating an external appearance of a component information retrieval system according to the first embodiment.

A component information retrieval system 1 according to the first embodiment has a simulation function of a plant and a retrieval function of a design material about a component forming the plant.

The component information retrieval system 1 includes a first display device 11, a second display device 12, a mouse 13, a keyboard 14, a joypad 15, and a component information retrieval device 16.

The first display device 11 displays a screen related to a simulation of the plant among computation results by the component information retrieval device 16.

The second display device 12 displays a screen related to retrieval of a component among the computation results by the component information retrieval device 16.

The mouse 13, the keyboard 14, and the joypad 15 are input devices that receive an input operation from a user to the component information retrieval device 16.

The component information retrieval device 16 performs a computation according to an input of the mouse 13, the keyboard 14, and the joypad 15 and causes the first display device 11 and the second display device 12 to display the screens.

Figure 2:
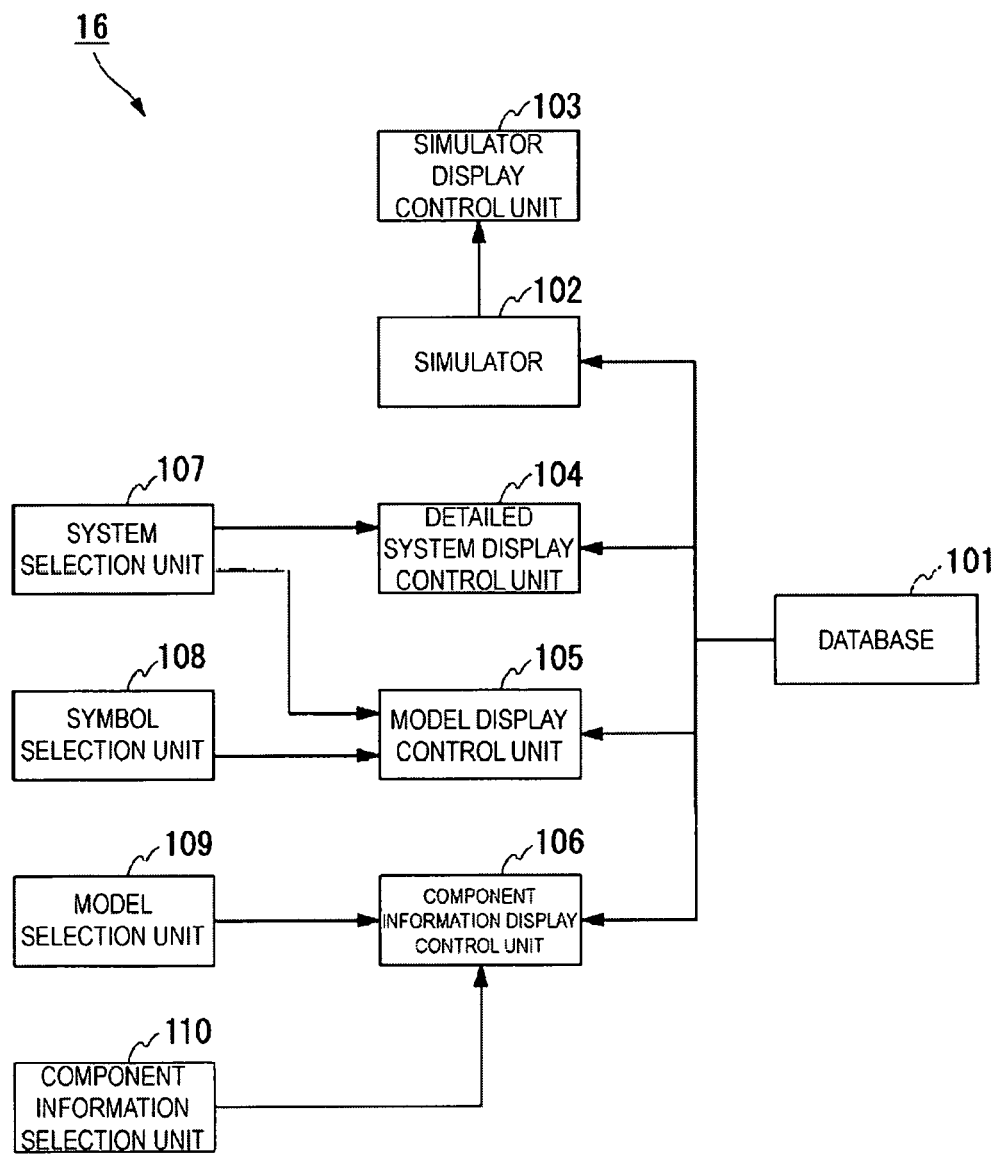
FIG. 2 is a schematic block diagram illustrating a software configuration of a component information retrieval device according to the first embodiment.

FIG. 2 is a schematic block diagram illustrating a software configuration of the component information retrieval device according to the first embodiment.

The component information retrieval device 16 includes a database 101, a simulator 102, a simulator display control unit 103, a detailed system display control unit 104, a model display control unit 105, a component information display control unit 106, a system selection unit 107, a symbol selection unit 108, a model selection unit 109, and a component information selection unit 110.

The database 101 stores information used in a simulation of the plant by the simulator 102 and design materials about components. Specifically, the database 101 stores an emulator program of a monitoring device of the plant, a model table storing information used for a configuration of a plant model being a three-dimensional model of the plant, a component information table storing design materials about components forming the plant, and a detailed system table storing a detailed system diagram for each system of the plant.

The emulator program is a program for simulating the monitoring device for monitoring the plant operating on the simulator.

The model table stores identification information about each component forming the plant (component ID), identification information about a system to which the component belongs (system ID), a component model being a three-dimensional model representing the component, and spatial coordinates on which the component model is disposed in association with one another.

The component information table stores each component ID of a component forming the plant and a design material about the component in association with each other.

The detailed system table stores a system ID and a detailed system diagram indicating a connection relationship between all components belonging to a system indicated by the system ID in association with each other.

The simulator 102 simulates an operation of the plant. Specifically, the simulator 102 reproduces the plant and an avatar of a user in a virtual space, based on the model table stored in the database 101 and simulates movement of the avatar in the plant. The user can operate the avatar by operating the joypad 15. The simulator 102 simulates an operation of a component represented by the component model reproduced near the avatar. The user can operate the component by operating the mouse 13 and the keyboard 14. The simulator 102 emulates the monitoring device that displays an operating state of the plant reproduced in the virtual space. The monitoring device is a device that displays the system screen indicating a connection relationship between components for each system of the plant and an operational state thereof. Hereinafter, the monitoring device emulated by the simulator 102 is referred to as a simulated monitoring device. The system screen displayed by the simulated monitoring device is referred to as a simulated system screen.

The simulator display control unit 103 causes the first display device 11 to display a result of the simulation by the simulator 102.

The detailed system display control unit 104 causes the second display device 12 to display a detailed system diagram indicating a connection relationship between all components belonging to one system.

The model display control unit 105 causes the second display device 12 to display a plant model formed of components belonging to one system.

The component information display control unit 106 causes the second display device 12 to display a design material about one component.

The system selection unit 107 receives a selection of a simulated system screen to be displayed on the first display device 11 by an operation on the mouse 13.

The symbol selection unit 108 receives a selection of one symbol from symbols included in the simulated system screen displayed on the first display device 11 by an operation on the mouse 13.

The model selection unit 109 receives a selection of one component model from component models forming a plant model displayed on the second display device 12 by an operation on the mouse 13.

The component information selection unit 110 receives a selection of one design material from a list of design materials displayed on the second display device 12 by an operation on the mouse 13.

Next, a method for retrieving a design material by using the component information retrieval device 16 will be described.

Figure 3:
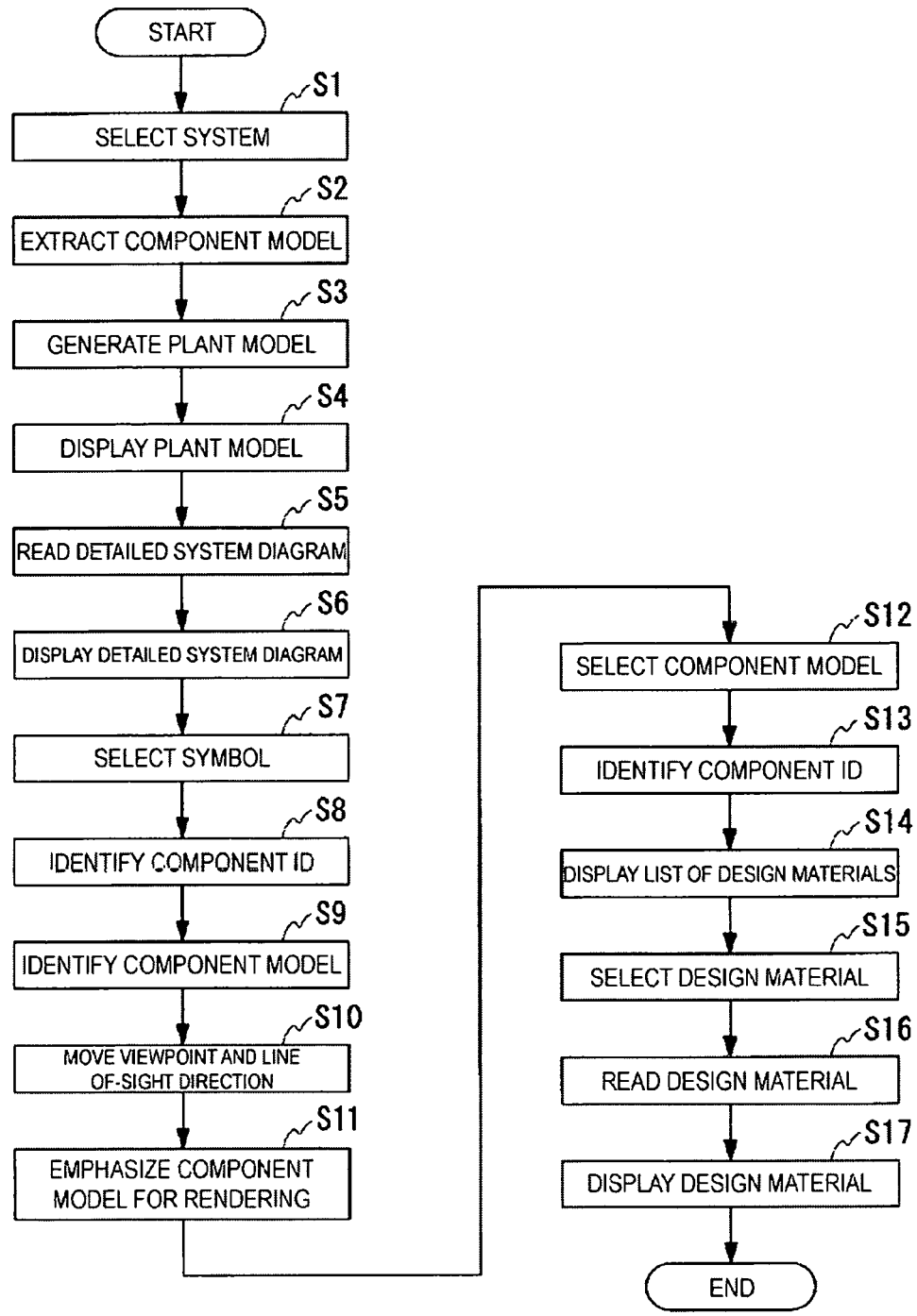
FIG. 3 is a flowchart illustrating operations of the component information retrieval device according to the first embodiment.

FIG. 3 is a flowchart illustrating operations of the component information retrieval device according to the first embodiment. In a case where the component information retrieval device 16 is used to retrieve a design material, a user starts the component information retrieval device 16 and causes the simulator 102 to emulate the simulated monitoring device. When the simulator 102 starts emulating the simulated monitoring device, the simulator display control unit 103 causes the first display device 11 to display a screen for receiving a selection of a system for which the simulated system screen is to be displayed from multiple systems.

The system selection unit 107 waits for a selection of a system by the user (Step S1). The user operates the mouse 13 and clicks the left mouse button on one system from choices of systems displayed on the first display device 11, and can thus select the system. When the system is selected by the user, the simulator 102 causes the simulated monitoring device to display the simulated system screen related to the selected system. In this way, the simulator display control unit 103 causes the first display device 11 to display the simulated system screen.

Figure 4:
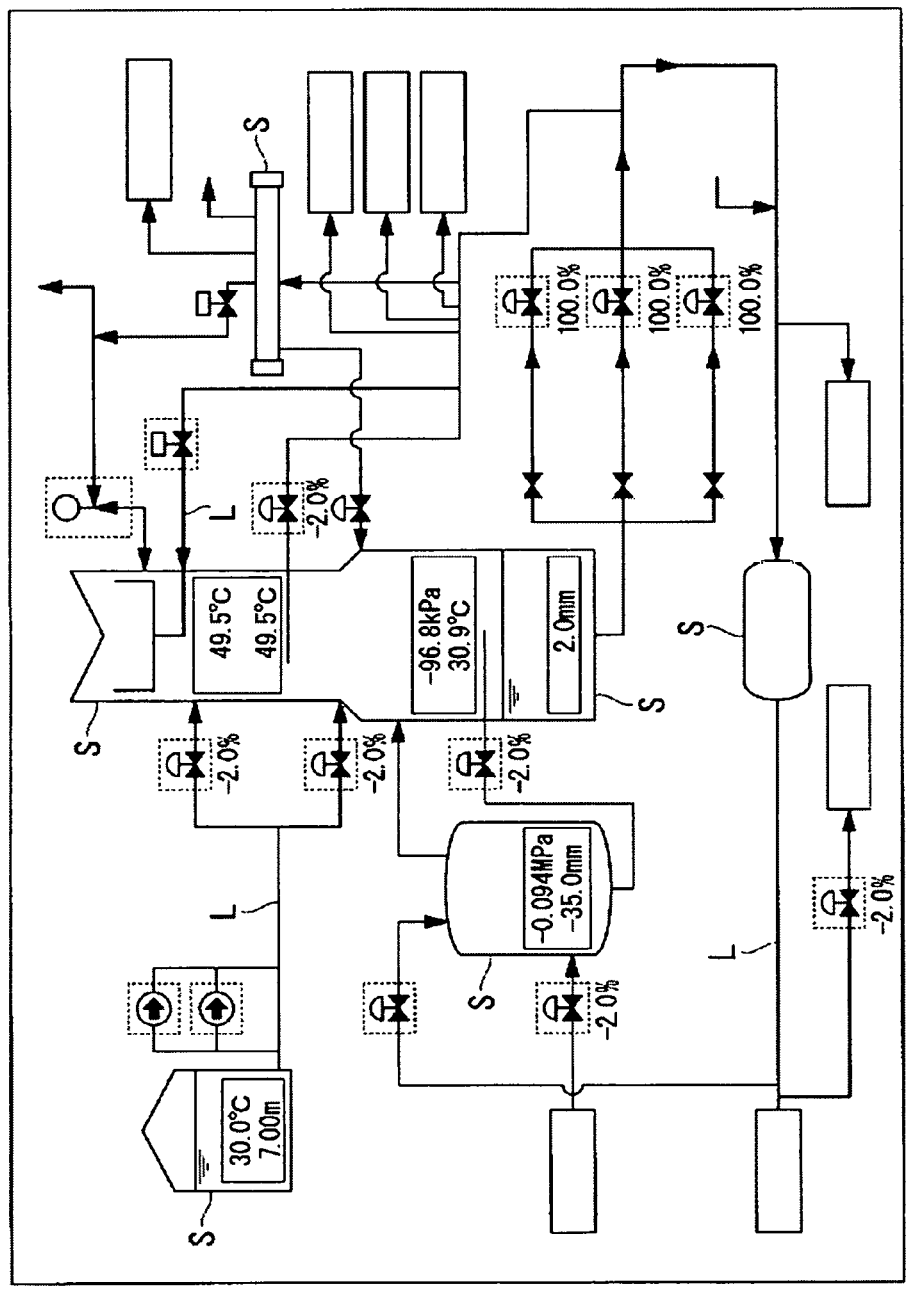
FIG. 4 is a diagram illustrating an example of a simulated system screen according to the first embodiment.

FIG. 4 is a diagram illustrating an example of the simulated system screen according to the first embodiment.

The simulated system screen displayed on the first display device 11 is a screen indicating a connection relationship between components belonging to the system selected by a user among systems of the plant and an operational situation of each of the components. The simulated system screen includes symbols S, representing components and lines, and L, representing connection relationship between components. Only a main component among components belonging to a system is represented by the symbol S in the simulated system screen. The reason is to prevent a complicated screen.

When the system selection unit 107 receives a selection of a system by the user in Step S1, the model display control unit 105 extracts a component model associated with the system ID indicating the selected system from the model table stored in the database 101 (Step S2). Next, the model display control unit 105 places the extracted component model in a virtual space according to spatial coordinates associated with the component model. In this way, the model display control unit 105 generates a plant model related to the selected system (Step S3). Then, the model display control unit 105 causes the second display device 12 to display the generated plant model (Step S4). At this time, the model display control unit 105 renders the plant model, based on arbitrary viewpoint coordinates.

Figure 5:
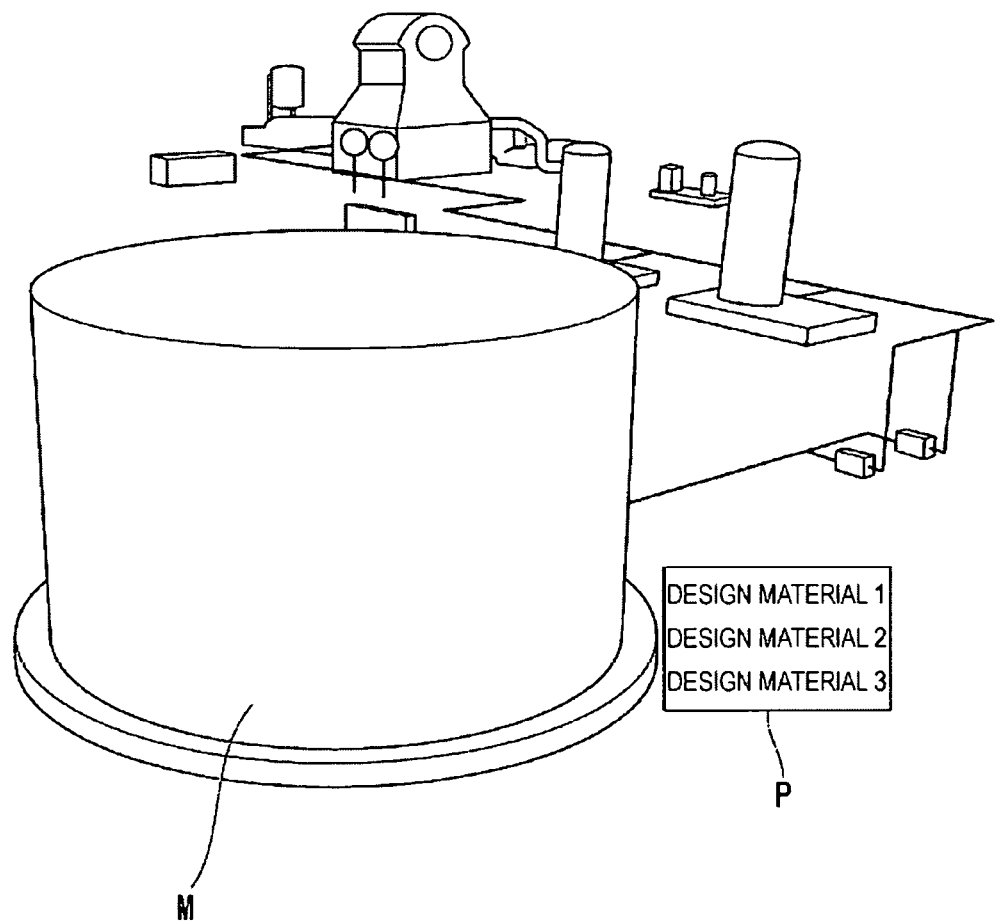
FIG. 5 is a diagram illustrating an example of a plant model according to the first embodiment.

FIG. 5 is a diagram illustrating an example of the plant model according to the first embodiment.

A plant model M displayed on the second display device 12 is a three-dimensional model formed of component models representing all components belonging to the system selected by a user among systems of the plant. The plant model M reproduces an actual spatial positional relationship between components. Component models representing piping connecting components among component models forming the plant model M are colored in colors different from each other. For example, a component model representing first piping is colored in red while a component model representing second piping is colored in blue.

The detailed system display control unit 104 reads a detailed system diagram associated with the system ID indicating the selected system from the detailed system table stored in the database 101 (Step S5). Next, the detailed system display control unit 104 causes the second display device 12 to display the read detailed system diagram (Step S6). The detailed system diagram displayed together with the plant model M on the second display device 12 is a system diagram indicating the connection relationship between all components belonging to the system selected by the user among systems of the plant. The detailed system diagram includes symbols representing components and a line(s) representing a connection relationship between the components. The line representing the connection relationship between components in the detailed system diagram is colored in the same color as the color of a component model representing piping connecting the components in the plant model M. In this way, the user can easily recognize that the piping indicated in the plant model M is connected to which component by comparing the detailed system diagram with the plant model M.

Next, the symbol selection unit 108 waits for a selection of a symbol S included in the simulated system screen displayed on the first display device 11 by the user (Step S7). The user operates the mouse 13 and clicks the left mouse button on one of symbols S included in the simulated system screen displayed on the first display device 11, and can thus select the symbol S. The symbol selection unit 108 receives the selection of the symbol S by the user and then identifies a component ID of a component represented by the symbol S (Step S8). Next, the model display control unit 105 identifies a component model associated with the identified component ID from the plant model M displayed on the second display device 12 (Step S9). Next, the model display control unit 105 moves viewpoint coordinates in the virtual space to a position at a predetermined distance away from spatial coordinates of the identified component model and directs a line-of-sight direction toward the component model (Step S10). At this time, the model display control unit 105 determines the viewpoint coordinates so as to avoid other component models between the viewpoint coordinates and the spatial coordinates of the identified component model. Next, the model display control unit 105 renders the plant model M with the identified component model being emphasized (Step S11). Examples of emphasis on a component model include coloring the component model with a color different from colors of other component models, causing the component model to blink, and applying a border around the component model. Note that the operation in Step S10, i.e., a close-up of the identified component model is one example of the emphasis on the identified component model. In this way, the second display device 12 displays the plant model M that takes a close-up of the component model corresponding to the symbol S selected in Step S7.

Next, the model selection unit 109 waits for a selection of a component model included in the plant model M displayed on the second display device 12 by the user (Step S12). The user operates the mouse 13 and clicks the right mouse button on one of component models included in the plant model M displayed on the second display device 12, and can thus select the symbol S. The component model selected by the user may not correspond to the symbol S selected in Step S7. The model selection unit 109 receives the selection of the component model by the user and then identifies a component ID of a component represented by the component model (Step S13). Next, the component information display control unit 106 causes the second display device 12 to display a list of design materials associated with the component ID identified by the model selection unit 109 as a pop-up menu P as illustrated in FIG. 5 (Step S14).

Next, the component information selection unit 110 waits for a selection of a design material included in the pop-up menu P displayed on the second display device 12 by the user (Step S15). The user operates the mouse 13 and clicks the left mouse button on one of the design materials included in the pop-up menu P displayed on the second display device 12, and can thus select the design material. The component information selection unit 110 receives the selection of the design material by the user and then reads the design material from the database 101 (Step S16). The component information display control unit 106 causes the second display device 12 to display the read design material (Step S17).

In this way, the component information retrieval system 1 according to the first embodiment allows a user to easily acquire a design material about a desired component. In other words, the user can acquire a design material about a desired component (target component) by the following procedure. First, the user selects a symbol S representing a component (representative component) near a target component from the simulated system screen displayed on the first display device 11 by operating the mouse 13. The simulated system screen is equivalent to a system screen of the monitoring device that the user usually operates, and thus the user can easily find the representative component. Next, the user selects a component model representing the target component from the plant model M displayed on the second display device 12 by operating the mouse 13. The plant model M displayed on the second display device 12 takes a close-up of a component model representing the representative component. Thus, the component model of the target component near the representative component is often displayed on the second display device 12 without an operation of moving, rotating, or enlarging the plant model M. Even in a case where the component model of the target component is not displayed on the second display device 12, the user can display the target component on the second display device 12 by a few operations. The design material about the target component is displayed on the second display device 12 by the procedure above.

The component information retrieval system 1 according to the first embodiment displays the plant model M in which the component model representing the representative component is emphasized by a mouse operation on the simulated system screen. In this way, even a user is unaccustomed to operating the simulator 102 with the keyboard 14 and the joypad 15, the user can easily recognize a spatial position of a component forming a plant.

The component information retrieval system 1 according to the first embodiment causes the first display device 11 to display the simulated system screen and causes the second display device 12 to display the plant model M, the detailed system diagram, and the design material. A system screen of an actual monitoring device does not display the plant model M, the detailed system diagram, or the design material by a selection of a symbol. Thus, the screen displayed on the first display device 11 is a screen in conformity with the actual monitoring device. In other words, the component information retrieval system 1 according to the first embodiment can present the plant model M, the detailed system diagram, and the design material without inhibiting emulation of the monitoring device.

The component information retrieval system 1 according to the first embodiment is a system for retrieving a design material about a component by using the simulated monitoring device emulated by the simulator 102. In this way, a user can train operations of a plant while referring to a design material about a component as an operation subject.

The number of symbols S included in the simulated system screen according to the first embodiment is less than the number of component models forming the plant model M. In this way, the component information retrieval system 1 prevents a complicated simulated system screen and allows a user to easily find a representative component near a target component.

The plant model M displayed on the second display device 12 is a plant model M formed of component models representing components belonging to a system selected by a user. In this way, the component information retrieval system 1 can prevent the displayed plant model M from being complicated.

While one embodiment has been described above in detail with reference to the drawings, various design modifications can be achieved without limiting a specific configuration to the above-described configuration.

For example, the component information retrieval system 1 according to the above-described embodiment retrieves a design material about a component by using a simulator of a plant. However, this is not restrictive. For example, the component information retrieval system 1 according to another embodiment may not have a simulator function of a plant. In this case, the component information retrieval system 1 causes a simulated system screen that is equivalent to a system screen of a monitoring device to be displayed without depending on the simulator function. For example, the component information retrieval system 1 according to another embodiment may be installed in a mobile terminal. In this way, a user can easily find a design material about an operation subject in an actual plant.

The component information retrieval system 1 according to the above-described embodiment takes a close-up of a component model related to the representative component selected from the plant model M to emphasize the component model, but this is not restrictive. For example, in another embodiment, a component model may be emphasized by coloring, blinking, bordering, or other methods instead of taking a close-up of the component model. In a case of not taking a close-up of the component model, a user needs to perform an operation of moving, rotating, or enlarging the plant model M. However, since a component model related to the representative component is emphasized, the target component can be easily found.

The component information retrieval system 1 according to the above-described embodiment, displays the plant model M in which the component model representing the representative component is emphasized by a mouse operation on the simulated system screen. However, this is not restrictive. For example, the component information retrieval system 1 according to another embodiment may display the plant model M in which the component model representing the representative component is emphasized by the keyboard 14, the joypad 15, or other input devices.

The component information retrieval system 1 according to the above-described embodiment causes the pop-up menu P to be displayed by clicking the right mouse button on a component model and causes a design material to be displayed by clicking the left mouse button on the design material included in the pop-up menu P. However, this is not restrictive. For example, the component information retrieval system 1 according to another embodiment may cause a design material to be displayed directly by clicking the left mouse button on a component model.

The component information retrieval system 1 according to the above-described embodiment displays a design material as information about a component. However, this is not restrictive. For example, in another embodiment, the component information retrieval system 1 may display a memo, a photograph, or other information described by an operator as information about a component.

The component information retrieval system 1 according to the above-described embodiment causes the first display device 11 to display the simulated system screen and causes the second display device 12 to display the plant model M, the detailed system diagram, and the design material. However, this is not restrictive. For example, the component information retrieval system 1 according to another embodiment may cause a single display device to display the simulated system screen, the plant model M, the detailed system diagram, and the design material. In this case, the component information retrieval system 1 may include only one display device.

The number of symbols S included in the simulated system screen according to the above-described embodiment is less than the number of component models forming the plant model M. However, this is not restrictive. For example, in the component information retrieval system 1 according to another embodiment, symbols S corresponding to all equipment may be displayed on the simulated system screen.

The database 101 according to the above-described embodiment stores the model table and the component information table each associated with the component ID. However, this is not restrictive. For example, the database 101 according to another embodiment may store one table that combines the model table and the component information table.

The model display control unit 105 in the above-described embodiment extracts a component model associated with a system ID indicating a system selected from the model table and generates the plant model M. However, this is not restrictive. For example, in another embodiment, the database 101 may previously store the plant model M for each system, and the model display control unit 105 may read, from the database 101, the plant model M related to a system selected from the database 101.

The component information retrieval system 1 according to the above-described embodiment displays the detailed system diagram in addition to the plant model M when a system to be displayed on the simulated system screen is selected. However, this is not restrictive. For example, the component information retrieval system 1 according to another embodiment may not display the detailed system diagram. In this case, component models representing piping of the plant model M may not be colored on a piping-by-piping basis.

Computer Configuration

Figure 6:
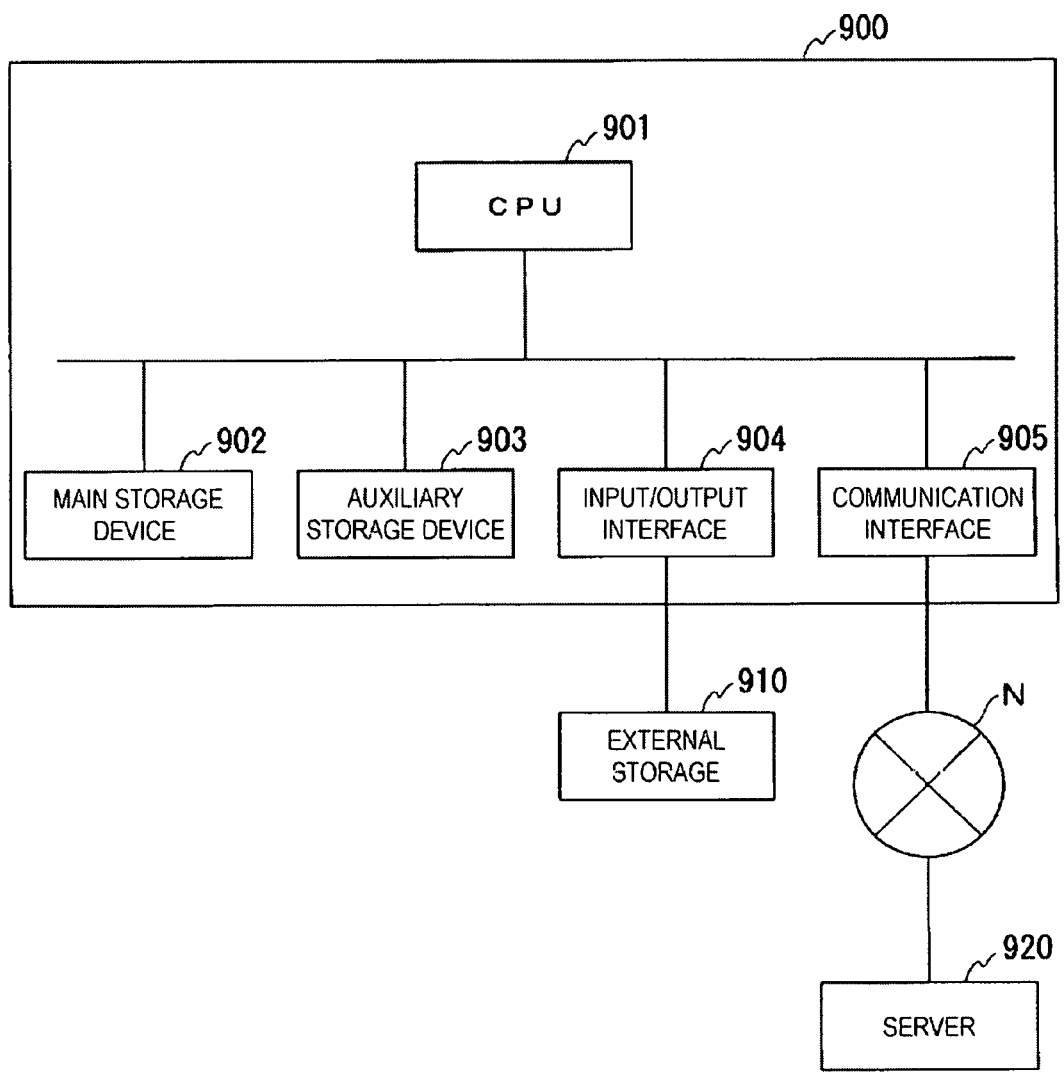
FIG. 6 is a schematic block diagram illustrating a configuration of a computer according to at least one embodiment.

FIG. 6 is a schematic block diagram illustrating a configuration of a computer according to at least one embodiment.

A computer 900 includes a CPU 901, a main storage device 902, an auxiliary storage device 903, an input/output interface 904, and a communication interface 905.

The above-described component information retrieval device 16 is installed in the computer 900. Then, operations of each of the above-described processing units are stored in the form of a program in the auxiliary storage device 903. The CPU 901 reads a program from the auxiliary storage device 903, develops the program in the main storage device 902, and executes the above-described processing according to the program. The CPU 901 secures a storage area corresponding to the above-described database 101 in the auxiliary storage device 903 according to the program.

Note that, in at least one embodiment, the auxiliary storage device 903 is one example of a non-transitory tangible medium. Other examples of the non-transitory tangible medium include an external storage 910 connected via the input/output interface 904 and an external server 920 connected via the communication interface 905. Examples of the external storage 910 include an optical disk, a magnetic disk, a magneto-optical disk, and a semiconductor memory.

In a case where a program is delivered from the external server 920 to the computer 900 through a network N, the computer 900 receiving the distribution may develop the program in the main storage device 902 and execute the above-described processing.

In another embodiment, the computer 900 may not necessarily include the communication interface 905.

The program may partially realize the functions described above. In addition, the program may be a differential file (differential program) that realizes the functions as described above in combination with another program already stored in the auxiliary storage device 903. For example, a program to realize the simulator function in the computer 900 and a program to realize the retrieval function in the computer 900 may be different programs.

In another embodiment, at least some of the database 101, the simulator 102, the simulator display control unit 103, the detailed system display control unit 104, the model display control unit 105, the component information display control unit 106, the system selection unit 107, the symbol selection unit 108, the model selection unit 109, and the component information selection unit 110 may be included in the external server 920, and an execution result thereof may be delivered to the computer 900. In other words, the component information retrieval system 1 may be realized by a cloud computing system and a grid computing system.

INDUSTRIAL APPLICABILITY

A component information retrieval device allows an operator to recognize a spatial position of a component by an operation on a system screen that the operator is accustomed to operating. A user selects a three-dimensional model representing the component, so that information about the component can be displayed on the component information retrieval device without input of a model name or a model number.

REFERENCE SIGNS LIST

1 Component information retrieval system
11 First display device
12 Second display device
13 Mouse
14 Keyboard
15 Joypad
16 Component information retrieval device
101 Database
102 Simulator
103 Simulator display control unit
104 Detailed system display control unit
105 Model display control unit
106 Component information display control unit
107 System selection unit
108 Symbol selection unit
109 Model selection unit
110 Component information selection unit

The invention claimed is:

1. A component information retrieval device for retrieving information about a component forming a plant, the component information retrieval device comprising:
    a system display control unit configured to cause a display unit to display a simulated system screen equivalent to a system screen displayed in a monitoring device of the plant, the system screen indicating a symbol representing the component together with a connection relationship between components;
    a symbol selection unit configured to receive a selection of the symbol from a user;
    a model display control unit configured to cause the display unit to display a plant model that is formed by a combination of component models each being a three-dimensional model representing the component, the plant model being a three-dimensional model of the plant and including a component model corresponding to the component represented by the selected symbol being emphasized, wherein component models representing piping among the component models are colored in colors different from each other;
    a model selection unit configured to receive a selection of the component model from the user;
    a component information display control unit configured to cause the display unit to display information about the component represented by the selected component model; and
    a detailed system display control unit configured to cause the display unit to display a detailed system diagram that indicates the connection relationship between the components represented by the component models forming the plant model and in which a line representing the connection relationship between the components is colored in the same color as a color of the component model representing the piping connecting the components.

2. The component information retrieval device according to claim 1, wherein
    the simulated system screen is a screen that displays information used in an operation of a simulator of the plant.

3. The component information retrieval device according to claim 1, wherein
    the number of the symbols included in the simulated system screen is less than the number of the component models forming the plant model.

4. The component information retrieval device according to claim 1, wherein
    the plant model is formed by the component models of the components belonging to a system indicated on the simulated system screen.

5. A component information retrieval method for retrieving information about a component forming a plant, the component information retrieval method comprising the steps of:
    causing, by a component information retrieval device, a display unit to display a simulated system screen equivalent to a system screen displayed in a monitoring device of the plant, the system screen indicating a symbol representing the component together with a connection relationship between components;
    receiving, by the component information retrieval device, a selection of the symbol from a user;
    causing, by the component information retrieval device, the display unit to display a plant model that is formed by a combination of component models each being a three-dimensional model representing the component, the plant model being a three-dimensional model of the plant and including a component model corresponding to the component represented by the selected symbol being emphasized, wherein component models representing piping among the component models are colored in colors different from each other;
    receiving, by the component information retrieval device, a selection of the component model from the user;

causing, by the component information retrieval device, the display unit to display information about the component represented by the selected component model; and causing, by the component information retrieval device, the display unit to display a detailed system diagram that indicates the connection relationship between the components represented by the component models forming the plant model and in which a line representing the connection relationship between the components is colored in the same color as a color of the component model representing the piping connecting the components.

6. A non-transitory computer-readable medium having a program stored thereon for causing a computer of a component information retrieval device for retrieving information about a component forming a plant to:

cause a display unit to display a simulated system screen equivalent to a system screen displayed in a monitoring device of the plant, the system screen indicating a symbol representing the component together with a connection relationship between components;

receive a selection of the symbol from a user;

cause the display unit to display a plant model that is formed by a combination of component models each being a three-dimensional model representing the component, the plant model being a three-dimensional model of the plant and including a component model corresponding to the component represented by the selected symbol being emphasized, wherein component models representing piping among the component models are colored in colors different from each other;

receive a selection of the component model from the user;

cause the display unit to display information about the component represented by the selected component model; and cause the display unit to display a detailed system diagram that indicates the connection relationship between the components represented by the component models forming the plant model and in which a line representing the connection relationship between the components is colored in the same color as a color of the component model representing the piping connecting the components.

\* \* \* \* \*